C

(12) United States Patent
Nakajima et al.

(10) Patent No.: US 6,851,458 B2
(45) Date of Patent: Feb. 8, 2005

(54) ON BOARD REFUELING VAPOR RECOVERY SYSTEM AND FUEL VAPOR PASSAGE USING FOR THE SAME

(75) Inventors: Takeaki Nakajima, Saitama (JP); Tadahisa Nakamura, Saitama (JP); Takeshi Honda, Saitama (JP); Kiyofumi Shida, Saitama (JP); Hiroto Inoue, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/219,933

(22) Filed: Aug. 16, 2002

(65) Prior Publication Data

US 2003/0037838 A1 Feb. 27, 2003

(30) Foreign Application Priority Data

Aug. 21, 2001 (JP) .................................... P. 2001-250072

(51) Int. Cl.[7] .............................................. F02M 37/04
(52) U.S. Cl. ........................... 141/44; 141/59; 141/307; 137/587; 123/516; 123/519
(58) Field of Search ............................... 141/44–47, 50, 141/52, 53, 59, 302–308; 137/587, 588; 123/516, 518–521

(56) References Cited

U.S. PATENT DOCUMENTS

| | | | | |
|---|---|---|---|---|
| 5,244,022 A | * | 9/1993 | Gimby | ........................ 141/301 |
| RE34,518 E | * | 1/1994 | Covert et al. | ................ 137/588 |
| 5,404,906 A | * | 4/1995 | Aoshima et al. | ............. 137/587 |
| 5,570,730 A | * | 11/1996 | Keehn et al. | .................. 141/59 |
| 5,606,954 A | | 3/1997 | Yamazaki et al. | |
| 5,657,734 A | * | 8/1997 | Sawamoto et al. | ......... 123/519 |

FOREIGN PATENT DOCUMENTS

| | | |
|---|---|---|
| JP | 04-224268 | 8/1992 |
| JP | 07-293385 | 11/1995 |
| JP | 08-021317 | 1/1996 |
| JP | 3158170 | 2/2001 |
| JP | 2003-028010 | 1/2003 |

OTHER PUBLICATIONS

Notification of Reasons for Refusal.

* cited by examiner

*Primary Examiner*—J. Casimer Jacyna
(74) *Attorney, Agent, or Firm*—Westerman, Hattori, Daniels & Adrian LLP (57) ABSTRACT

An on board refueling vapor recovery system includes a first fuel vapor passage for connecting a fuel tank with a canister, a second fuel vapor passage for connecting an inlet portion of a fuel filler pipe with the fuel vapor passage (a tank main body) and a check valve in the second fuel vapor passage. The check valve is integrated with a first quick connector of a resin hose (a resin tube) which constitutes the second fuel vapor passage. Therefore, the number of man hours required for assembling the on board refueling vapor recovery system can be reduced. In addition, the space required for installing any of the on board refueling vapor recovery system can also be reduced. Furthermore, the amount of released fuel evaporative emissions or fuel evaporative emissions can be reduced.

2 Claims, 8 Drawing Sheets

ON BOARD REFUELING VAPOR RECOVERY SYSTEM AND FUEL VAPOR PASSAGE USING FOR THE SAME

BACKGROUND OF THE INVENTION

1. Field of the Invention

The present invention relates to an on board refueling vapor recovery system for controlling an amount of fuel evaporative emissions released when a fuel tank of a vehicle is refilled with fuel and fuel vapor passage using for the same.

2. Description of the Related Art

Fuel evaporative emissions released from a fuel tank of a vehicle is one of the major sources of air pollution when the fuel tank is refilled with a fuel. Due to this, for example, in the United States of America, an amount of fuel evaporative emissions released at the time of refilling fuel tanks of vehicles is regulated.

Figure 7:
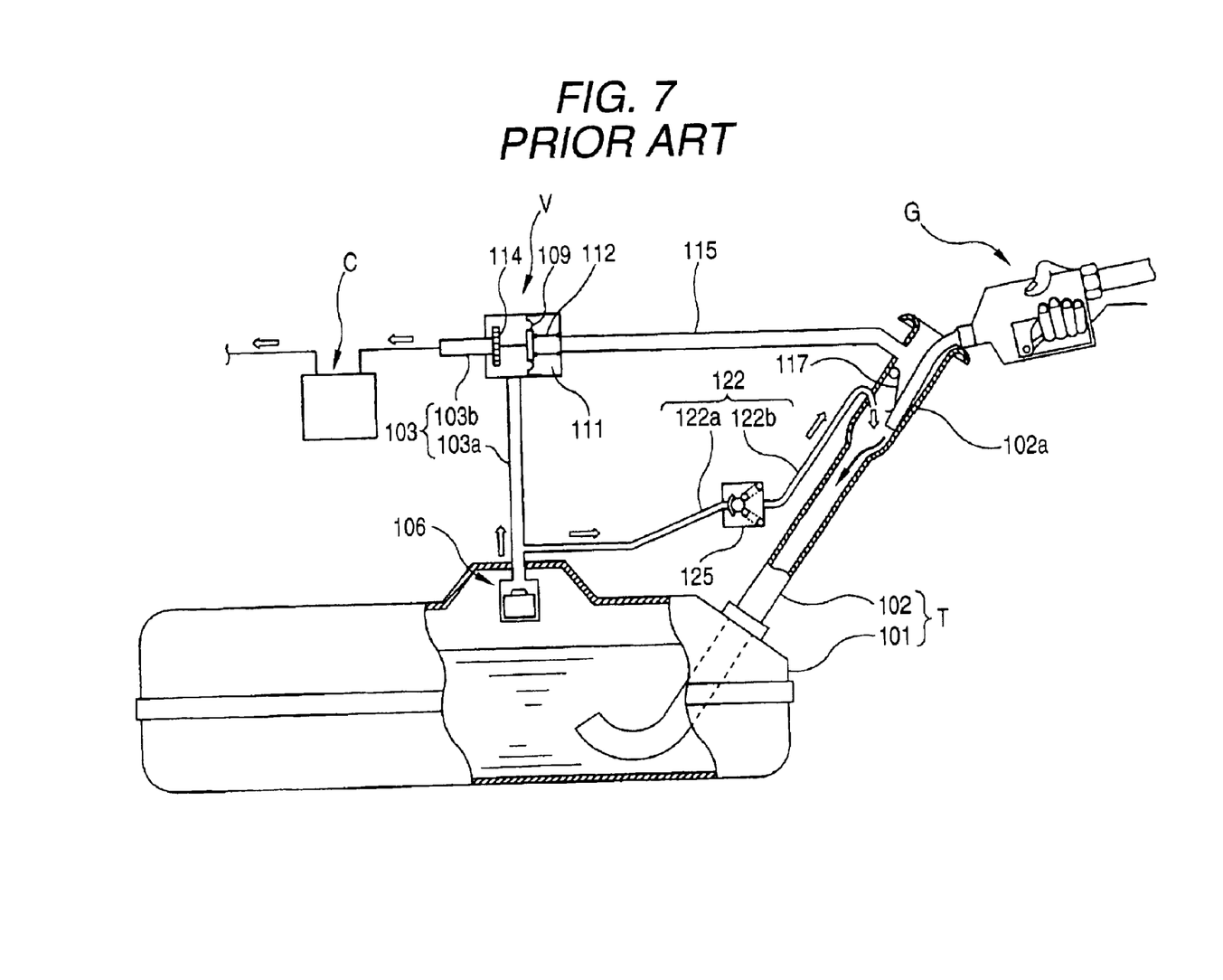
FIG. 7 is a cut-way sectional view showing the overall construction of a conventional on board refueling vapor recovery system.

To cope with an regulation of the amount of the fuel evaporative emissions, on-board evaporative recovery (called ORVR) system are equipped on vehicles so that the amount of fuel evaporative emissions is controlled. an known on board refueling vapor recovery of this type is described in the specification of Japanese Patent No. 3158170 by the applicant of this patent application (refer to FIG. 7).

In the on board refueling vapor recovery shown in FIG. 7, a fuel tank T comprises a tank main body 101 and a fuel filler pipe 102 provided to extend upwardly in an inclined fashion from the tank main body 101, and a fuel filler inlet portion 102a having a larger diameter is provided at an upper end of the fuel filler pipe 102.

In addition, one end portion of a first fuel vapor passage 103 connects to an upper portion of the tank main body 101, and a canister C for adsorbing fuel evaporative emissions released from the fuel tank T connects to the other end of the first fuel vapor passage 103.

A float valve 106 is provided at a connecting portion to the interior of the tank main body 101 of the first fuel vapor passage 103. The float valve 106 is adapted to close when a level of fuel in the tank main body 101 of the fuel tank T reaches a predetermined level to cut off a flow of the fuel evaporative emissions to the canister side. Note that in the specification, white arrows outlined with black lines in the accompanying drawings denoted directions of the fuel evaporative emissions.

Interposed at an intermediate position along the first fuel vapor passage 103 is a valve V adapted to open at the time of refueling the vehicle. A diaphragm 109 and a valve element 114 connected to the diaphragm 109 to interlock therewith are provided in the valve V, and the valve element 114 deforms to open at the time of refueling by way of a relationship between a pressure of the fuel filler inlet portion 102a inputted into the diaphragm 109 via a communication path 115 and a pressure of the fuel evaporative emissions flowing from the tank main body 101 toward the canister C.

Owing to this, the fuel evaporative emissions released from the tank main body 101 flow toward the canister C at the time of refueling.

Note that reference numeral 111 denotes a spring chamber and reference numeral 112 denotes a spring.

A second fuel vapor passage 122 is provided so that the passage branches from the first fuel vapor passage 103 (103a) which connects the float valve 106 with the valve V.

The second fuel vapor passage 122 connects to the fuel filler inlet portion 102a at a position which is closer to the tank main body 102 than to a shutter 117 to constitute a circulation path for the fuel evaporative emissions.

In addition, provided at an intermediate position along the second fuel vapor passage 122 is a check valve called a vapor recirculation valve 125 adapted to open to allow fuel evaporative emissions to flow from the tank main body 101 side to the fuel filler inlet portion 102a side when a differential pressure between the tank main body 101 side and the fuel filler inlet portion 102a reaches or exceeds a predetermined value.

In addition, the second fuel vapor passage 122 also serves to prevent outside air from being entrained by a flow of fuel into the tank main body 101 when the vehicle is refueled from a fuel filler nozzle.

Namely, the amount of the fuel evaporative emissions released from the tank main body 101 at the time of refueling should correspond to the amount of fuel so refilled. However, when the outside air (air) is taken into the tank main body 101 the amount of fuel evaporative emissions released from the tank main body 101 increases.

Furthermore, since the fuel evaporative emissions are promoted for reasons of saturated vapor pressure when outside air is incorporated, the amount of the fuel evaporative emissions released from the tank main body 101 increases further.

However, an incorporation of outside air is prevented or reduced by providing the second fuel vapor passage 122 for recirculation of the fuel evaporative emissions as shown in FIG. 7.

This allows the amount of fuel evaporative emissions released from the tank main body 101 can be reduced to the amount of fuel that has been refilled in the tank main body 101.

In addition, in the event that the valve V does not open due to a slow speed at which the fuel tank T is refilled with fuel, the check valve 125 prevents the release of the fuel evaporative emissions to the atmosphere from the fuel filler inlet portion 102a via the second fuel vapor passage 122. Namely, since the slow refueling speed lowers the pressure of fuel evaporative emissions attempting to flow toward the canister C, the valve V is not activated.

On the other hand, an amount of the fuel evaporative emissions corresponding to the volume of refilled fuel overflows from the tank main body 101. Here, in the event that there exists no pressure resistance in the second fuel vapor passage 122, the overflowed fuel evaporative emissions pass through the second fuel vapor passage and are eventually released to the atmosphere from the fuel filler inlet portion 102a.

However, with the check valve 125 provided along the second fuel vapor passage 122 as shown in FIG. 7, the release of the fuel evaporative emissions to the atmosphere is restrained. Moreover, a pressure of the fuel evaporative emissions at the valve V becomes higher corresponding to an amount of the release of the fuel evaporative emissions is suppressed.

Namely, an opening of the valve V is promoted by the check valve 125 (the valve opening pressure of the check valve 125 is set to be slightly higher than that of the valve V). When the valve V opens fuel evaporative emissions flow through the first fuel vapor passage 103 (103a, 103b) toward the canister C, whereby the release of the fuel evaporative emissions to the atmosphere is restrained.

Thus, the second fuel vapor passage 122 and the check valve 125 provided therealong play an important role in on board refueling vapor recovery.

Figure 8:
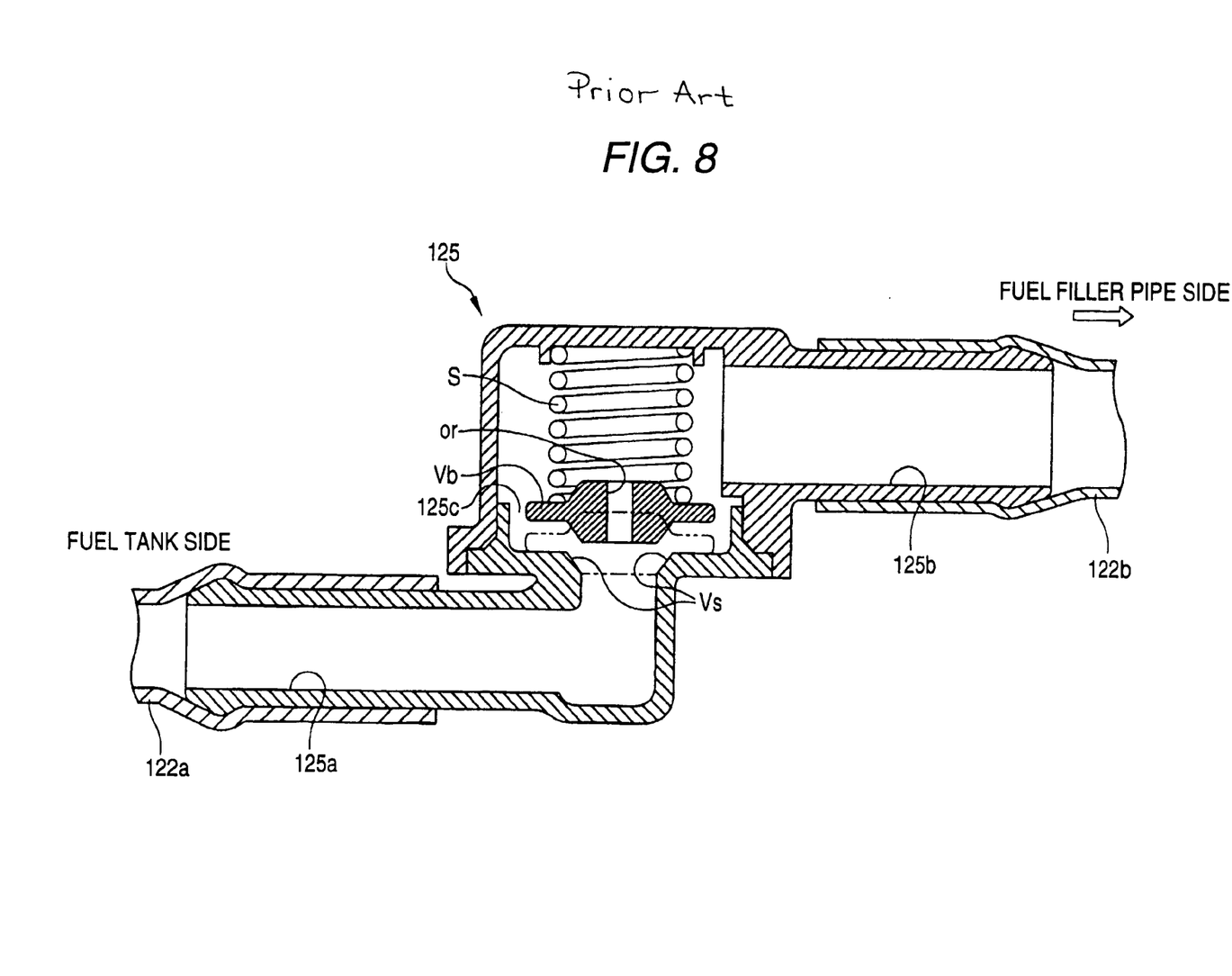
FIG. 8 is a sectional view of a check valve shown in FIG. 7.

Here, the check valve 125 is shown in FIG. 8.

As shown in FIG. 8, the check valve 125 has an inlet side hose opening 125a, an outlet side hose opening 125b and a valve chamber 125c. A valve seat Vs is formed in the valve chamber 125c. A valve element Vb is inserted in the valve chamber 125c, and the valve element Vb is biased toward the valve seat Vs by means of a spring S.

An orifice is formed in the valve element Vb, and even if the check valve 125 is in a closed condition, a slight amount of fuel vapor is allowed to flow through the check valve 125.

Incidentally, in the case of the check valve 125 shown in FIG. 8, in an attempt to assemble the check valve 125 to the second fuel vapor passage 122, an inlet side hose 122a of the second fuel vapor passage 122 must connect to the inlet side hose opening 125a, while an outlet side hose 122b of the second fuel vapor passage 122 must connect to the outlet side hose opening 125b.

In addition, in an attempt to install the check valve 125 and hence the on board refueling vapor recovery in a limited space, the check valve 125 needs to be miniaturized both in size and weight to reduce the installation space. Additionally, the amount of fuel evaporative emissions needs to reduced further.

SUMMARY OF THE INVENTION

It is an object of the invention to provide an on board refueling vapor recovery system and a fuel vapor passage which requires only a less number of man hours for assembling and a limited space for installation and which can reduce an amount of released fuel evaporative emissions.

According to a first aspect of the invention, an on board refueling vapor recovery system comprising:

a first fuel vapor passage connecting a fuel tank with a canister; and a second fuel vapor passage connecting a fuel filler inlet portion of a fuel filler pipe with a fuel tank, the second fuel vapor passage having a check valve and a quick connector of a resin tube, wherein the check valve is integrally formed with the quick connector.

According to the construction of the first aspect of the invention, the quick connector of the resin tube (the resin hose) is integrated (constructed to be integrated) with the check valve of the quick connector. Owing to this, the number of man hours for connecting the fuel filler inlet portion of the fuel filler pipe with the furl tank (a first fuel vapor passage in a first embodiment that will be described later) or the number of man hours for assembling the second fuel vapor passage can be reduced. Note that the check valve here realizes the function of a vapor recirculation valve (this applies to the description of the following aspects of the invention).

According to a second embodiment of the invention, an on board refueling vapor recovery system comprising:

a first fuel vapor passage connecting a fuel tank with a canister, the first fuel vapor passage having a container of a float valve; and a second fuel vapor passage connecting a fuel filler inlet portion of a fuel filler pipe with a fuel tank, the second fuel vapor passage having a check valve, wherein the check valve is integrally formed with the container of the float valve.

According to the construction of the second aspect of the invention, the check valve is integrated (constructed to be integrated) with the container of the float valve in the fuel tank. Owing to this, the reduction in the number of man hours for assembling the second fuel vapor passage can be attained.

Furthermore, according to a third aspect of the invention, a fuel passage using for an on board refueling vapor recovery system, the fuel passage connecting an inlet portion of a fuel filler pipe with a fuel tank, the fuel passage comprising:

a check valve; and a quick connector disposed at both ends of the fuel passage, wherein the quick connector is integrally formed with the check valve.

According to the construction of the third aspect of the invention, at least one of the quick connectors of the fuel vapor passage constituted by the resin tube (the resin hose) has the function of the check valve (at least one of the quick connectors is constructed to be integrated with the check valve).

Moreover, according to a fourth aspect of the invention, an on board refueling vapor recovery system comprising:

a first fuel vapor passage connecting a fuel tank with a canister; and a second fuel vapor passage connecting a fuel filler inlet portion of a fuel filler pipe with the fuel tank, the second fuel vapor passage having a check valve, wherein the check valve is integrally formed with a connecting portion of the fuel tank for connecting the second fuel vapor passage.

According to the construction of the fourth aspect of the invention, the check valve is integrated (constructed to be integrated) with the joint for the fuel vapor passage. Owing to this, the reduction in the number of man hours for assembling the fuel vapor passage can be attained. Note that the "joint for the second fuel vapor passage" corresponds to a vapor return joint in an embodiment that will be described later.

DETAILED DESCRIPTION OF THE PREFERRED EMBODIMENTS

Embodiments of the invention will be described in detail with reference to the accompanying drawings. Note that in the description of the embodiments, they are divided.

(1) A first embodiment in which a check valve is integrated with a quick connector of a resin tube that includes a second fuel vapor passage.

(2) A second embodiment in which a check valve is integrated with a container for a float valve in a fuel tank.

(3) A third embodiment in which a check valve is integrated with a vapor return joint member provided on a fuel tank.

First Embodiment

Firstly, an on board refueling vapor recovery system according to a first embodiment will be described.

Figure 1:
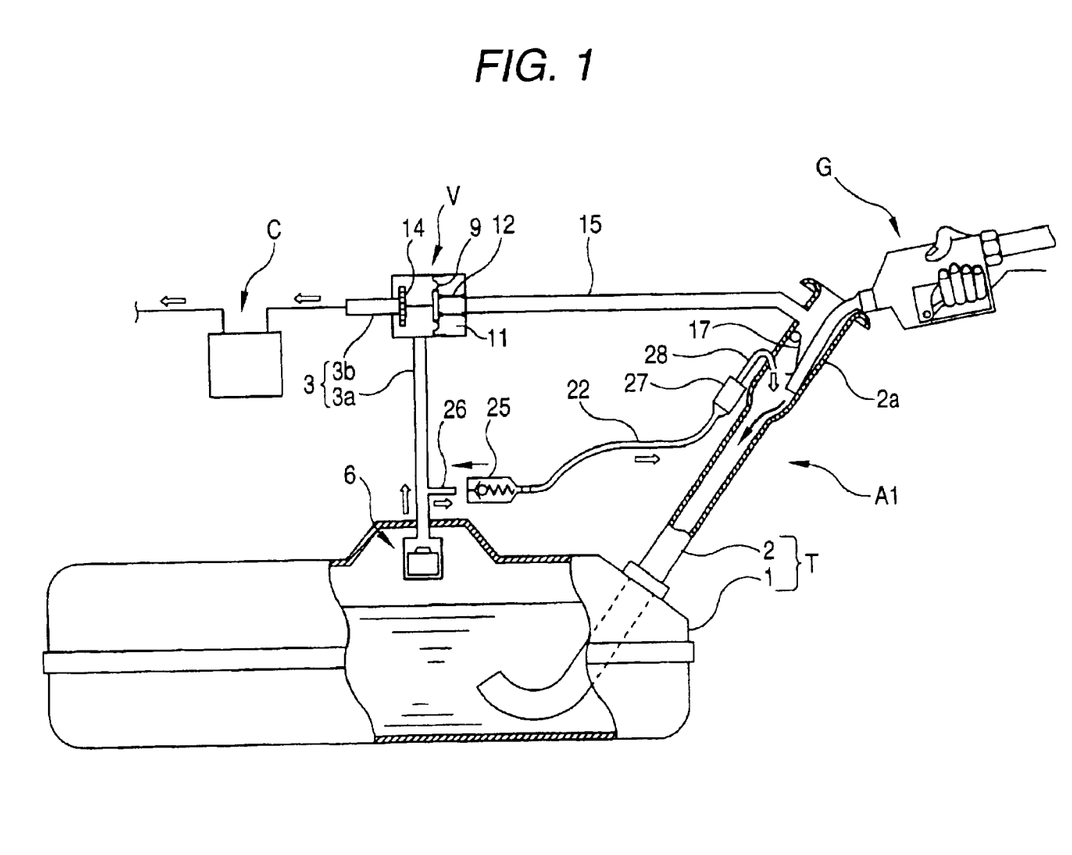
FIG. 1 is a cut-away sectional view showing the overall construction of an on board refueling vapor recovery system of a first embodiment according to the invention.
Figure 2A:
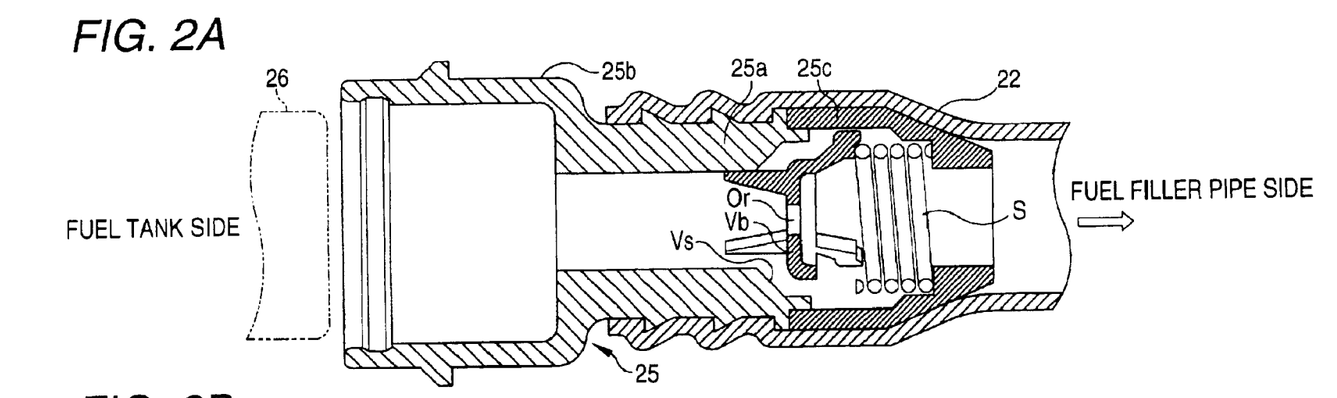
FIG. 2A is a sectional view of a first quick connector into which a check valve is integrated.
Figure 2B:
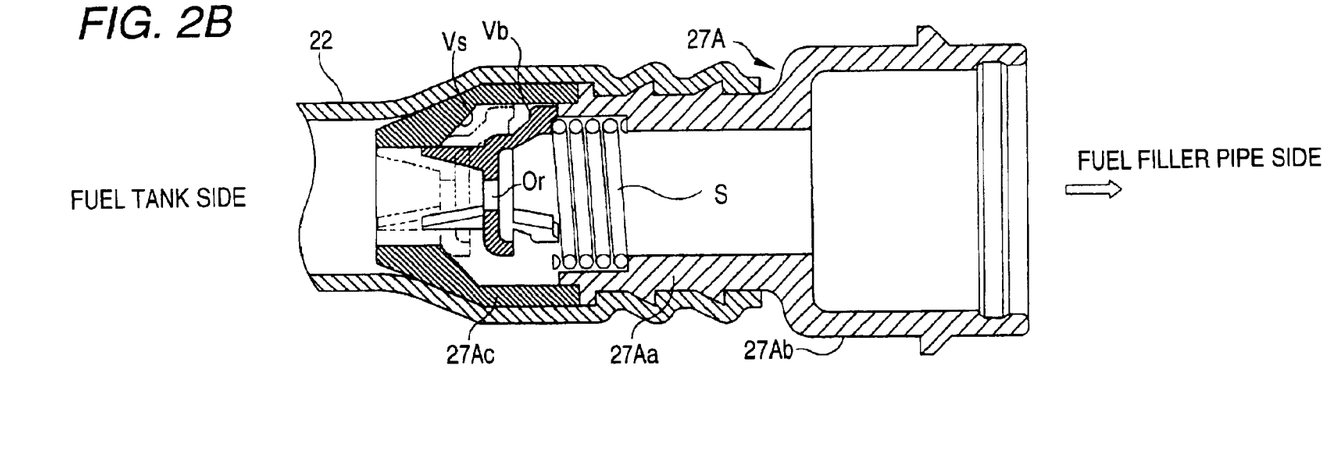
FIG. 2B is a sectional view showing a modified example to a second quick connector.
Figure 3A:
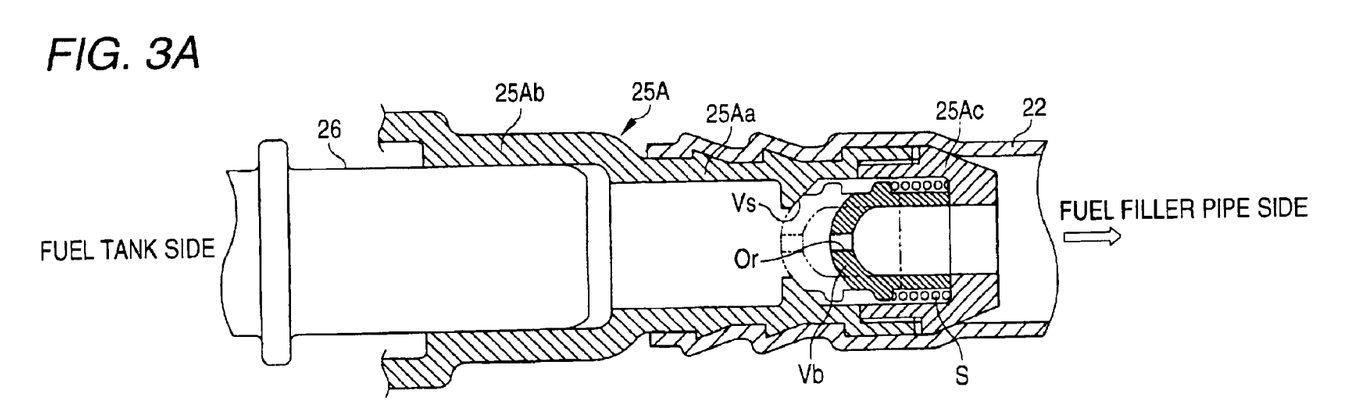
FIG. 3A is a sectional view showing a modified example to the first quick connector.
Figure 3B:
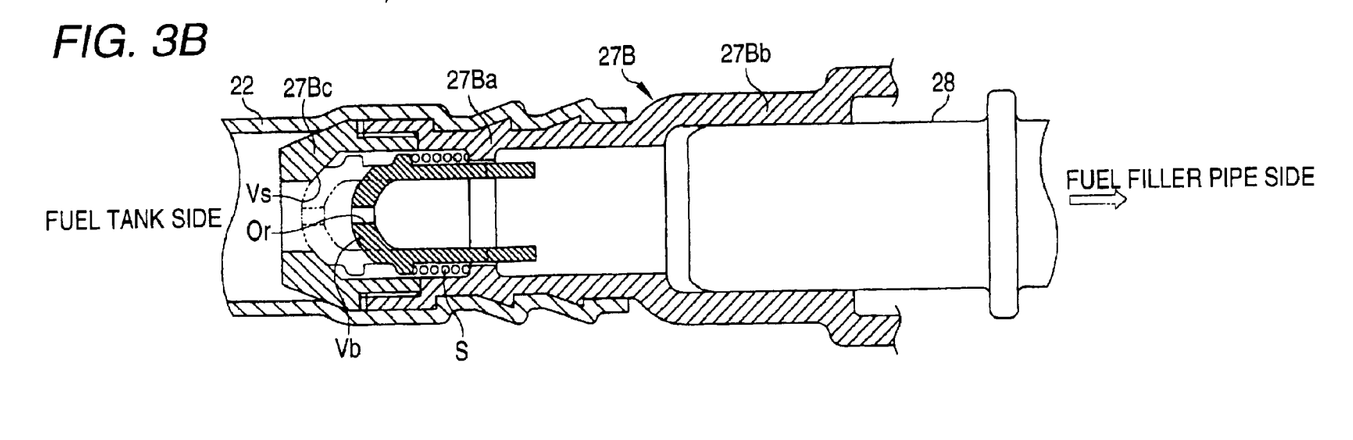
FIG. 3B is a sectional view showing another modified example to the second quick connector.

FIG. 1 is a cut-away sectional view showing the overall construction of the on board refueling vapor recovery system according to the first embodiment. FIG. 2A is a sectional view of a first quick connector into which a check valve is integrated. FIG. 2B is a sectional view showing a modified example of a second quick connector. FIG. 3A is a sectional view of a modified example of the first quick connector, and FIG. 3B is another modified example of the second quick connector.

As shown in FIG. 1, a fuel tank T includes a tank main body 1 and a fuel filler pipe 2 provided to extend from the tank main body 1 upwardly in an inclined fashion, and a fuel filler inlet portion 2a having a larger diameter. The fuel filler inlet portion 2a is provided at an upper end of the fuel filler pipe 2.

In addition, one end portion of a first fuel vapor passage 3 connects to an upper portion of the tank main body 1, while the other end of the first fuel vapor passage 3 connects to a canister C for adsorbing a fuel evaporative emissions released from the fuel tank T. A float valve 6 is provided at a connecting portion of the first fuel vapor passage 3 to the interior of the tank main body 1. The float valve 6 is adapted to close to cut off the flow of the fuel evaporative emissions to the canister side when a level of fuel in the interior of the tank main body 1 reaches a predetermined level.

In addition, an on board refueling vapor recovery system A1 according to the first embodiment includes the first fuel vapor passage (3a, 3b), a second fuel vapor passage 22, a valve V and the canister C.

The valve V is provided at an intermediate position along a length of the first fuel vapor passage 3. The valve V is designed to open when refueling the vehicle. Diaphragm 9 and a valve element 14 connecting to the diaphragm 9 to interlock therewith are provided in the valve V. The diaphragm 9 deforms corresponding to a relationship between a pressure in the fuel filler inlet portion 2a and a pressure of the fuel evaporative emissions flowing from the tank main body 1 toward the canister C. The pressure of the fuel filler inlet portion 2a is inputted in the diaphragm 9 via a communication path 15 while refueling the vehicle. Accordingly, the valve element 14 opens. Owing to this, the fuel evaporative emissions released from the tank main body 1 at the time of refueling flow toward the canister C. Note that reference numeral 11 denotes a spring chamber and reference numeral 12 denotes a spring.

In addition, the first fuel vapor passage 3 (3a) for connecting the float valve 6 with the valve V connects to the fuel filler inlet portion 2a at a position below a shutter 17 (on a tank main body 1 side) by way of a second fuel vapor passage 22. The second fuel vapor passage 22 is a hose of a flexible resin such as nylon. The second fuel vapor passage 22 includes a circulation path of the fuel evaporative emissions. Here, a first quick connector 25 having a function of the check valve connects to one end of the second fuel vapor passage 22, and a normal quick connector 27 connects to the other end of the second fuel vapor passage 22.

The connection of the one end of the second fuel vapor passage 22 with the first fuel vapor passage 3a is implemented by one-touch fastening the first quick connector 25 with a connecting pipe 26 branched from the first fuel vapor passage 3a (FIG. 1 shows a state in which no connection therebetween is made).

On the other hand, the connection of the other end of the second fuel vapor passage 22 with the fuel filler inlet portion 2a is implemented by one-touch fastening the second quick connector 27 with a connecting pipe 28 provided to extend from the fuel filler inlet portion 22.

Namely, the one-touch fastening, for example, of a nylon hose (tube) to a metallic pipe or a resin pipe can be implemented through one action and with good pressure resistance without using flare nuts. In addition, the second fuel vapor passage 22 having the first quick connector 25 connected to one end and the second quick connector 27 connected to the other end thereof corresponds to fuel vapor passages using for the "on board refueling vapor recovery system of the invention".

The first quick connector 25 has a function of a vapor recirculation valve for permitting a flow of fuel from the tank main body 1 side to the fuel filler inlet portion by being opened when a differential pressure between the tank main body 1 side and the fuel filler inlet portion 2a reaches a predetermined value. The function of the fuel vapor passage 22 and the function of the vapor recirculation valve that is possessed by the check valve (the first quick connector 25) are as has been described in relation to the related art, and therefore, a repeated description thereof will be omitted here.

Charcoal is filled in the canister C for adsorbing the fuel evaporative emissions passing through the valve V. The desorbed fuel evaporative emissions are released by fresh air taken in while the vehicle is running, and then the fuel evaporative emissions are burned in the engine. Since the canister C repeats adsorption and release, the canister C can be used substantially through the life of the vehicle (ELCD: Evaporative Loss Control Device).

Next, with reference to FIG. 2A, a specific construction of the first quick connector 25 having the check valve function will be described.

As shown in FIG. 2A, a valve seat Vs is formed in the interior of a hose opening 25a of the first quick connector 25. In addition, a valve element Vb and a biasing spring S are inserted in the first quick connector 25. A biasing spring S biases the valve element Vb to the valve seat Vs side (to the tank main body 1 side). The valve element Vb has a disc-like main body on which three legs (only two of them are shown in FIG. 2A) and three arms (only two of them are shown in FIG. 2A) are provided, and it also has an orifice Or substantially in the center of the main body thereof. The three legs abut with one end (the tank main body 1 side) of the biasing spring S and transmit biasing force from the biasing spring S. The three arms serve as a guide for preventing the inclination of the valve element Vb. The orifice Or is provided to satisfy contradicting demands to prevent the entrainment of outside air from the fuel filler inlet portion 2a and the promotion of the increase in pressure of fuel evaporative emissions in the closing valve, in particular, in the event that the refueling speed is slow.

The valve element Vb moves to the fuel filler pipe 2 side against a biasing force of the biasing spring S when a pressure on the tank main body 1 side and the differential pressure on the fuel filler inlet portion 2a reach or exceed predetermined activation pressures by refilling fuel, whereby the first quick connector 25 opens. When the first quick connector 25 opens fuel evaporative emissions also flow to the fuel filler pipe 2 side from a gap between the valve seat Vs and the valve element Vb.

In addition, the valve element Vb and the biasing spring S are inserted into the first quick connector 25 from a distal end portion 25c of the hose opening 25a. Incidentally, the first quick connector 25 is made from resin, and the hose opening 25a and the distal end portion 25c thereof are subjected to a welding treatment by ultrasonic waves after they have been inserted in the first quick connector 25. A fastening portion 25b is a portion for one-touch connection with the connecting pipe 26 shown by double-dashed lines. This portion is identical to that of common quick connectors, and therefore, the description thereof will be omitted.

In the on board refueling vapor recovery system A1 according to the first embodiment, the first and second quick connectors 25, 27 are used to assemble the second fuel vapor passage 22 (namely, the second fuel vapor passage 22 is a single resin hoe (resin tube)). Due to this, the assembling operation of the second fuel vapor passage 22 can be implemented with a single hand. Moreover, since the first quick connector has a function of a check valve, a large number of man hours are not required in this embodiment as in the case with the conventional example shown in FIG. 7 in which a large number of man hours are required for assembling together the first fuel vapor passage 103a and the second fuel vapor passage 122a, assembling together the second fuel vapor passage 122a and the check valve 125, assembling together the check valve 25 and the second fuel vapor passage 122b and assembling together the second fuel vapor passage 122b and the fuel filler inlet portion 102a. Moreover, since the valve element Vb and the biasing spring S are inserted in the hose opening 25a of the first quick connector 25 to thereby constitute a check valve, the space for installing the check valve and hence the on board refueling vapor recovery system A1 can be reduced. In addition, since the number of connecting positions is reduced when compared with the conventional example, there is little opportunity for fuel evaporative emissions to leak from the connecting portions. Namely, the amount of fuel evaporative emissions released is reduced. Furthermore, the check valve utilizing the biasing spring S can select any set load for the biasing spring and is stable in quality. Owing to this, the valve opening timing scatters little over individual check valves.

Next, a modified example to the first embodiment (modified examples to the second and first quick connectors into which the check valve is integrated) will be described.

FIG. 2B is a sectional view showing a modified example to the second quick connector into which the check valve is integrated. As shown in FIG. 2B, a second quick connector 27A including a check valve function has a valve element Vb and a biasing spring S which are both inserted therein as well as the first quick connector 25 shown in FIG. 2A.

In addition, a valve seat Vs is formed on a distal end portion 27c situated on the tank main body 1 side. As with the aforesaid first quick connector 25, the valve element Vb has a disc-like main body 25 on which three legs (only two of them are shown in FIG. 2B) and two arms (only one of them are shown in FIG. 2B) are provided, and it has an orifice or substantially in the center of the main body. The three legs abut with one end (the tank main body 1 side) of the biasing spring S and biasing force is transmitted from the biasing spring S. The two arms serve have a role of a guide for preventing the inclination of the valve element Vb. Note that in FIG. 2B, reference numeral 27Aa denotes a hose opening and reference numeral 27Ab denotes a fastening portion.

The second quick connector 27A according to the modified example is also one-touch connected to the connecting pipe 28 provided on the fuel filler inlet portion 2a. Note that provided that the second fuel vapor passage 22 connects to this second quick connector 27A on the fuel filler pipe 2 side, the second fuel vapor passage 22 does not have to have the first connector 25 having the check valve function at the end facing the tank main body 1, and a normal type of quick connector may be used for one-touch fastening.

In addition, a first quick connector 25A according to a modified example shown in FIG. 3A may be used on the tank main body 1 side of the second fuel vapor passage 22. This first quick connector 25A differs from the first quick connector 25 only in the construction of the valve element Vb, and the overall function and operation thereof remain the same as those that have already been described above.

Furthermore, the modified second quick connector 27A may be replaced by a second quick connector 27B according to a modified example shown in FIG. 3B. This second quick connector 27B differs from the aforesaid modified second quick connector 27A only in the construction of the valve element Vb, and the overall function and operation thereof remain the same as those that have already been described before.

These modified examples can also attain the reduction in the number of assembling man hours, installation space, and amount of released fuel evaporative emissions.

Second Embodiment

Next, an on board refueling vapor recovery system according to a second embodiment will be described. Note that like reference numerals to those used in the first embodiment will be imparted to like members and elements to those described in the first embodiment, and the description thereof will be omitted.

Figure 4:
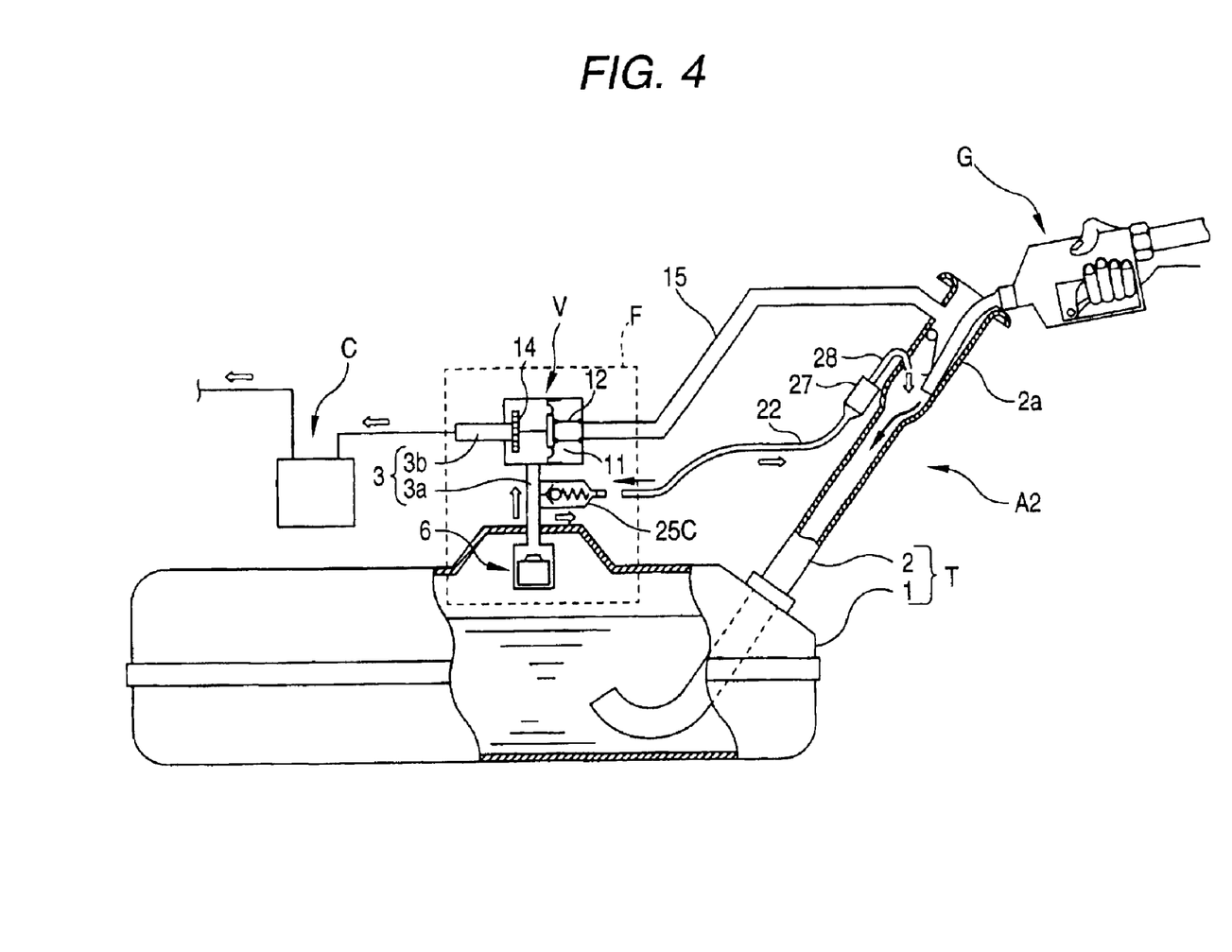
FIG. 4 is a cut-away sectional view showing the overall construction of a second embodiment according to the invention.
Figure 5:
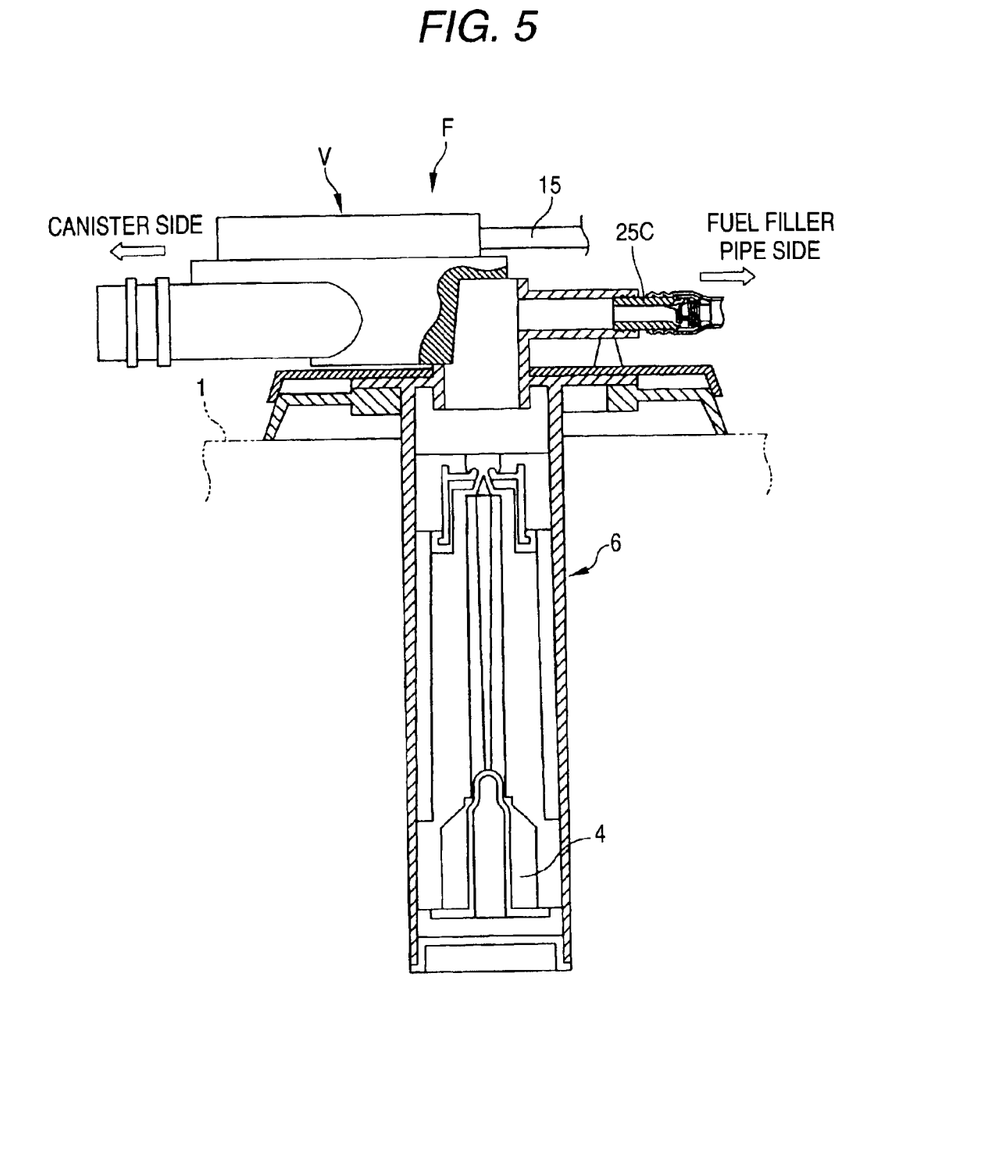
FIG. 5 is a partially cut-away view showing a float valve container in a fuel tank into which a check valve shown in FIG. 4 is integrated.

FIG. 4 is a cut-away sectional view showing the overall construction of the on board refueling vapor recovery system according to the second embodiment of the invention. FIG. 5 is a partially cut-away view showing a float valve container in a fuel tank into which a check valve is integrated.

As shown in FIG. 5, a float valve 6, a valve V, a check valve 25C and a first fuel passage 3 (3a, 3b) which are surrounded by broken lines in FIG. 4 are integrally accommodated formed in a float valve container F.

The check valve 25C is provided in a sleeve protruding from a right-hand side of an upper portion of the float valve 6. A connecting portion of the check valve 25 to a second fuel vapor passage 22 is made to be a hose opening for easy connection, since the second fuel vapor passage 22 is a resin tube (FIG. 4 shows a condition where the second fuel vapor passage 22 is not connected).

In addition, a valve element and a biasing spring are inserted in the check valve 25C. The check valve 25C opens and closes as the valve element is brought into and out of abutment with a valve seat. Furthermore, in FIG. 5, reference numeral 4 denotes a float which is the valve element of the float valve 6.

According to the second embodiment, since the main parts of the on board refueling vapor recovery system are integrated with the float valve container F, the on board refueling vapor recovery system may be assembled to a fuel tank T only by assembling the float valve container F to the tank main body 1, connecting the check valve 25C to the second fuel vapor passage 22, connecting the valve V to a communication path 15 and connecting the valve V to the canister C. Consequently, a number of assembling man hours can largely be reduced.

In addition, since the number of connecting portions is reduced when compared with the conventional examples, there is little fuel vapor that leaks from the connecting portions.

Third Embodiment

Next, an on board refueling vapor recovery system according to a third embodiment will be described. Note that like reference numerals to those used in the first and second embodiments will be imparted to like members and elements to those described in the first and second embodiments, and the description thereof will be omitted here.

Figure 6:
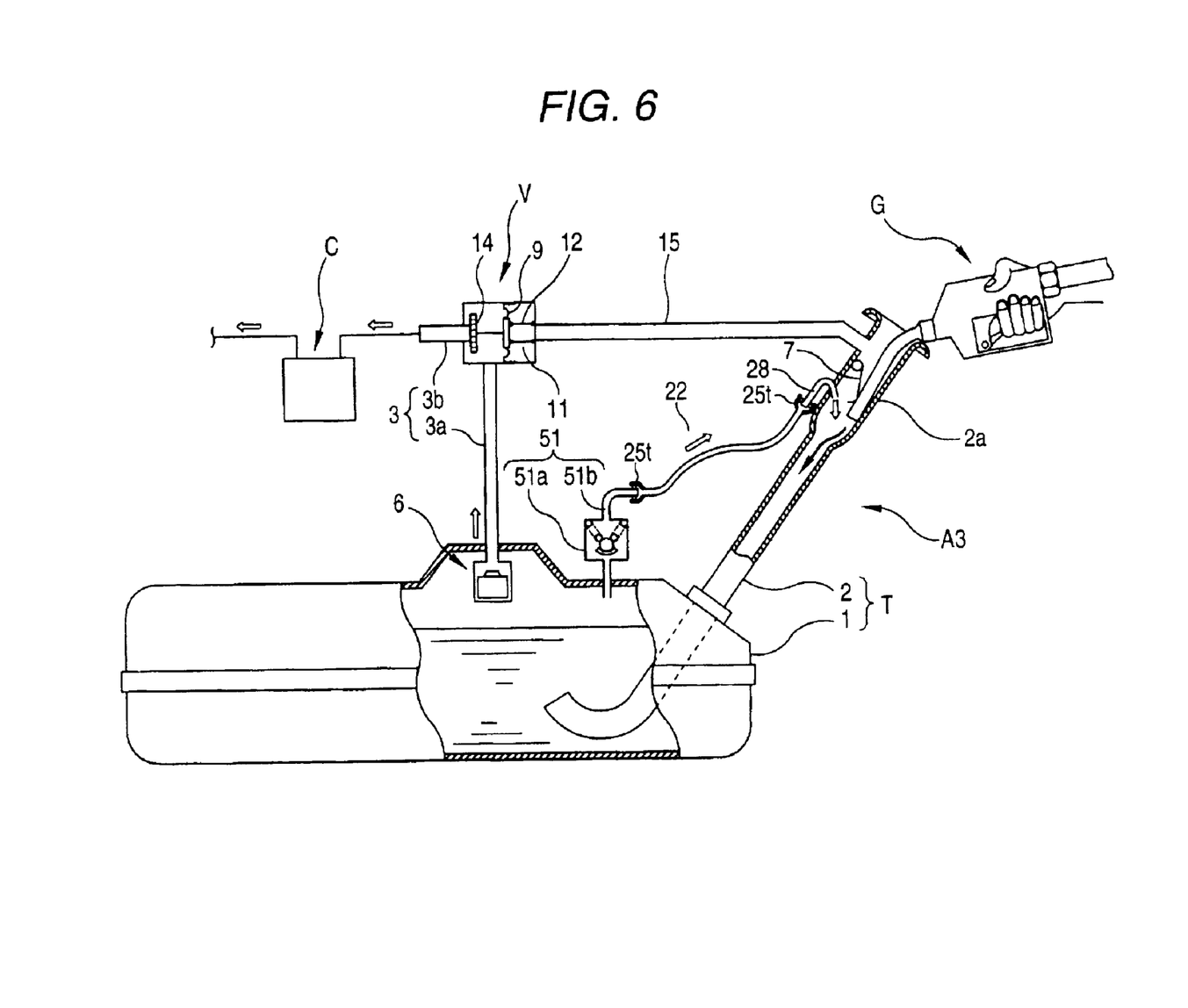
FIG. 6 is a cut-away sectional view showing the overall construction of an on board refueling vapor recovery system of a third embodiment according to the invention.

FIG. 6 is a cut-away view showing the overall construction of an on board refueling vapor recovery system according to a third embodiment.

As shown in FIG. 6, no second fuel vapor passage 22 is connected to a first fuel vapor passage 3 (3a) of the on board refueling vapor recovery system according to the third embodiment of the invention as with the first and second embodiments.

Owing to this, there is provided neither a connecting pipe 26 (refer to FIG. 1) like the one provided in the first embodiment nor a check valve 25C (refer to FIG. 4) like the one provided in the second embodiment. Instead, a vapor return joint member 51 is provided directly on a tank main body 1 as a member connecting to the second fuel vapor passage 22. The vapor return joint member 51 is constructed such that a check valve 51a provided on the tank main body 1 is provided with a connecting pipe 51b. This check valve 51a has the same function as that of the conventional check valve 125 (refer to FIG. 7). The connecting pipe 51b is a member adapted to be one-touch fastened to a quick connector 25t connecting to an end portion of the second fuel vapor passage 22. Note that the quick connector 25t is identical to the second quick connector 27 in the first and second embodiments and does not have the check valve function. In addition, the second fuel vapor passage 22 is constituted by a resin tube as with the first embodiment.

In the on board refueling vapor recovery system A3 according to the third embodiment, fuel evaporative emissions generated in the tank main body 1 are allowed to pass to the second fuel vapor passage 22 via an independent path from the first fuel vapor passage 3 (3a), that is, the vapor recirculation member 51 provided directly on the tank main body 1.

According to the third embodiment, the assembling operation of the second fuel vapor passage 22 can be implemented with a single hand, and moreover, since the identical quick connectors 25t are connected to the ends of the second fuel vapor passage 22, there is no need to think of the direction in which the second fuel vapor passage is assembled, thereby making it possible to eliminate an assembling operation error at the time of assembling the passage. In addition, the number of assembling man hours can be reduced. Furthermore, since the number of connecting portions is reduced when compared with the conventional examples, there is little fuel vapor that leaks from the connecting portions by an extent that the connecting portions are reduced.

Note that the invention does not have to be limited to the embodiments (the first to third embodiments) and may be modified variously.

For example, quick connectors used are not limited to specific types but a wide variety of quick connectors can be used together with the invention. In addition, the resin tube (resin hose) may be formed of various types of materials such as nylon having a good durability to fuel evaporative emissions. Furthermore, quick connectors may also be formed of various materials (including metallic materials) having a good durability to fuel evaporative emissions.

According to the invention that has been described heretofore, in any of the aspects thereof, the number of man hours required for assembling the on board refueling vapor recovery system can be reduced. In addition, the space required for installing any of the on board refueling vapor recovery system can also be reduced. Furthermore, the amount of released fuel evaporative emissions or fuel evaporative emissions can be reduced.

What is claimed is:

1. An on board refueling vapor recovery system comprising:

a first fuel vapor passage connecting a fuel tank with a canister; and a second fuel vapor passage connecting a fuel filler inlet portion of a fuel filler pipe directly with a fuel tank by way of said first fuel vapor passage, the second fuel vapor passage formed by a single tube and having a check valve and a quick connector of a resin tube, wherein the check valve is integrally formed with the quick connector, and said quick connector is directly connected to said first fuel vapor passage.

2. The on board vapor recovery system of claim 1, wherein said check valve and quick connector connected to the fuel tank further comprise:

a biasing spring disposed within said quick connector;

wherein one end of said quick connector extends toward said biasing spring, and wherein said one end of said quick connector presents a supporting member which substantially contacts with an inner-peripheral side of said quick connector in contact with said spring, while the support member abuts with the spring member; and wherein the other end of said quick connector, extends in an opposite direction of said one end.

* * * * *